US011637524B2

(12) United States Patent
Searcy et al.

(10) Patent No.: US 11,637,524 B2
(45) Date of Patent: Apr. 25, 2023

(54) SOLAR TRACKING APPARATUSES INCLUDING ONE OR MORE SOLAR PANELS, SYSTEMS INCLUDING THE SAME, AND METHODS OF USING THE SAME

(71) Applicant: Tiny Ventures Holdings Group, LLC, Pleasant Grove, UT (US)

(72) Inventors: Michael Taylor Searcy, Orem, UT (US); Scott McDonald Ure, Springville, UT (US)

(73) Assignee: Tiny Ventures Holdings Group, LLC, Pleasant Grove, UT (US)

( * ) Notice: Subject to any disclaimer, the term of this patent is extended or adjusted under 35 U.S.C. 154(b) by 0 days.

(21) Appl. No.: 16/964,260

(22) PCT Filed: Jan. 15, 2019

(86) PCT No.: PCT/US2019/013621
§ 371 (c)(1),
(2) Date: Jul. 23, 2020

(87) PCT Pub. No.: WO2019/147433
PCT Pub. Date: Aug. 1, 2019

(65) Prior Publication Data
US 2021/0044251 A1 Feb. 11, 2021

Related U.S. Application Data

(60) Provisional application No. 62/622,242, filed on Jan. 26, 2018.

(51) Int. Cl.
*H02S 20/32* (2014.01)
*H02S 10/40* (2014.01)
(Continued)

(52) U.S. Cl.
CPC ............ *H02S 20/32* (2014.12); *G01S 3/7862* (2013.01); *G05D 3/105* (2013.01); *H02S 10/40* (2014.12)

(58) Field of Classification Search
CPC .......... H02S 20/32; H02S 10/41; H02S 20/20; H02S 20/30; H02S 30/10; G01S 3/7862; G05D 3/15; Y02E 10/50
See application file for complete search history.

(56) References Cited

U.S. PATENT DOCUMENTS

| 8,119,963 | B2 | 2/2012 | Scanlon |
| 9,573,510 | B2 | 2/2017 | Andretich |

(Continued)

FOREIGN PATENT DOCUMENTS

| KR | 2018061874 A | * | 6/2018 | ............... A61G 5/04 |
| WO | 2012015378 A1 | | 2/2012 | |

(Continued)

OTHER PUBLICATIONS

International Search Report and Written Opinion from International Application No. PCT/US2019/013621 dated Apr. 12, 2019.
U.S. Appl. No. 62/622,242, filed Jan. 26, 2018.
Reda, "Solar Position Algorithm for Solar Radiation Applications", National Renewable Energy Laboratory, Revised Jan. 2008, 40 pages.

*Primary Examiner* — Bethany L Martin
(74) *Attorney, Agent, or Firm* — Dorsey & Whitney LLP

(57) ABSTRACT

Embodiments disclosed herein relate to solar tracking apparatuses, systems that include the same, and methods of operating the same. An example solar tracking apparatus includes a structure attachment portion configured to be attached to a structure (e.g., a moveable or stationary structure) and to remain relatively stationary relative to the structure. The structure attachment portion may include one or more mounts configured to attach the structure attachment portion to the structure. The solar tracking apparatus also includes at least one solar panel portion coupled to the (Continued)

structure attachment portion. The solar panel portion may be configured to move relative to the structure attachment portion and the structure. For example, the solar tracking apparatus may include one or more actuators coupled to solar panel portion configured to move at least a portion of the solar panel portion relative to the structure attachment portion.

19 Claims, 11 Drawing Sheets

(51) Int. Cl.
*G01S 3/786* (2006.01)
*G05D 3/10* (2006.01)

(56) References Cited

U.S. PATENT DOCUMENTS

| 2013/0057023 A1* | 3/2013 | Kim | F24S 25/70 |
| | | | 296/181.1 |
| 2013/0192659 A1 | 8/2013 | Upton et al. | |
| 2014/0190551 A1 | 7/2014 | French | |

FOREIGN PATENT DOCUMENTS

| WO | 2012071404 A1 | 5/2012 |
| WO | 2016172768 A1 | 11/2016 |

* cited by examiner

SOLAR TRACKING APPARATUSES INCLUDING ONE OR MORE SOLAR PANELS, SYSTEMS INCLUDING THE SAME, AND METHODS OF USING THE SAME

CROSS-REFERENCE TO RELATED APPLICATIONS

This application is a U.S. National Stage Application of PCT International Application No. PCT/US2019/013621 filed on Jan. 15, 2019, which claims priority to U.S. Provisional Application No. 62/622,242 filed on Jan. 26, 2018, the disclosure of each of which is incorporated herein, in its entirety, by this reference.

BACKGROUND

Solar panels are often attached to structures. The solar panels may be mounted to the structures using a stationary apparatus (e.g., a non-moveable structure) or a solar tracking apparatus that moves the solar panels relative to the structure.

However, users and producers of solar panels continue to seek new and improved solar tracking apparatuses.

SUMMARY

Embodiments disclosed herein relate to solar tracking apparatuses, systems that include the same, and methods of operating the same. An example solar tracking apparatus includes a structure attachment portion configured to be attached to a structure (e.g., a moveable or stationary structure) and to remain relatively stationary relative to the structure.

In an embodiment, a solar tracking apparatus is disclosed. The solar tracking apparatus includes a structure attachment portion including one or more mounts configured to be coupled to a structure. The solar tracking apparatus also includes at least one solar panel portion coupled to the structure attachment portion and configured to hold one or more solar panels. The at least one solar panel portion is moveable in at least two directions relative to the structure attachment portion. The solar tracking apparatus further includes one or more actuators coupled to the at least one solar panel portion. The one or more actuators are configured to move the at least one solar panel portion relative to the structure attachment portion. Additionally, the solar tracking apparatus includes a controller operably coupled to the one or more actuators. The controller is configured to control the one or more actuators so the one or more solar panels held by the at least one solar panel portion generally face the sun.

In an embodiment, a system is disclosed. The system includes a structure and a solar tracking apparatus. The solar tracking apparatus includes a structure attachment portion including one or more mounts coupled to a structure. The solar tracking apparatus also includes at least one solar panel portion coupled to the structure attachment portion and configured to hold one or more solar panels. The at least one solar panel portion is moveable in at least two directions relative to the structure attachment portion. The solar tracking apparatus further includes one or more actuators coupled to the solar panel portion. The one or more actuators are configured to move the solar panel portion relative to the structure attachment portion. Additionally, the solar tracking apparatus includes a controller operably coupled to the one or more actuators. The controller is configured to control the one or more actuators so the one or more solar panels held by the at least one solar panel portion generally face the sun.

In an embodiment, method of operating a solar tracking apparatus is disclosed. The method includes, responsive to direction from a controller, moving at least one solar panel portion in at least two directions relative to a structure attachment portion with one or more actuators coupled to the controller so one or more solar panels coupled to the at least one solar panel portion generally face the sun with almost no interaction from an individual. The structure attachment portion is coupled or couplable to a structure and the least one solar panel portion is coupled to the structure attachment portion.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Embodiments disclosed herein relate to solar tracking apparatuses, systems that include the same, and methods of operating the same. An example solar tracking apparatus includes a structure attachment portion configured to be attached to a structure (e.g., a moveable or stationary structure) and to remain relatively stationary relative to the structure. The structure attachment portion may include one or more mounts configured to attach the structure attachment portion to the structure. The solar tracking apparatus also includes at least one solar panel portion coupled to the structure attachment portion. The solar panel portion may be configured to move relative to the structure attachment portion and the structure. For example, the solar tracking apparatus may include one or more actuators coupled to solar panel portion configured to move at least a portion of the solar panel portion relative to the structure attachment portion.

The solar panel portion is configured to move in two or more directions relative to the structure attachment portion. The actuators coupled to the solar panel portion may be configured to controllably move the solar panel portion in the two or more directions relative to the structure attachment portion. Moving the solar panel portion in two or more directions relative to the structure attachment portion may improve the efficiency of the solar tracking apparatus since it allows the solar panels attached to the solar panel portion to more effectively oriented relative to the sun. For example, moving the solar panel portion in two or more directions relative to the structure attachment portion may improve the efficiency of the solar tracking apparatus by, for example, about 45% or more compared to solar panels that does not move. Whereas, moving the solar panel portion in only one direction relative to the structure attachment portion may only improve the efficiency of the solar tracking apparatus by about 24% compared to solar panels that does not move.

Figure 1A:
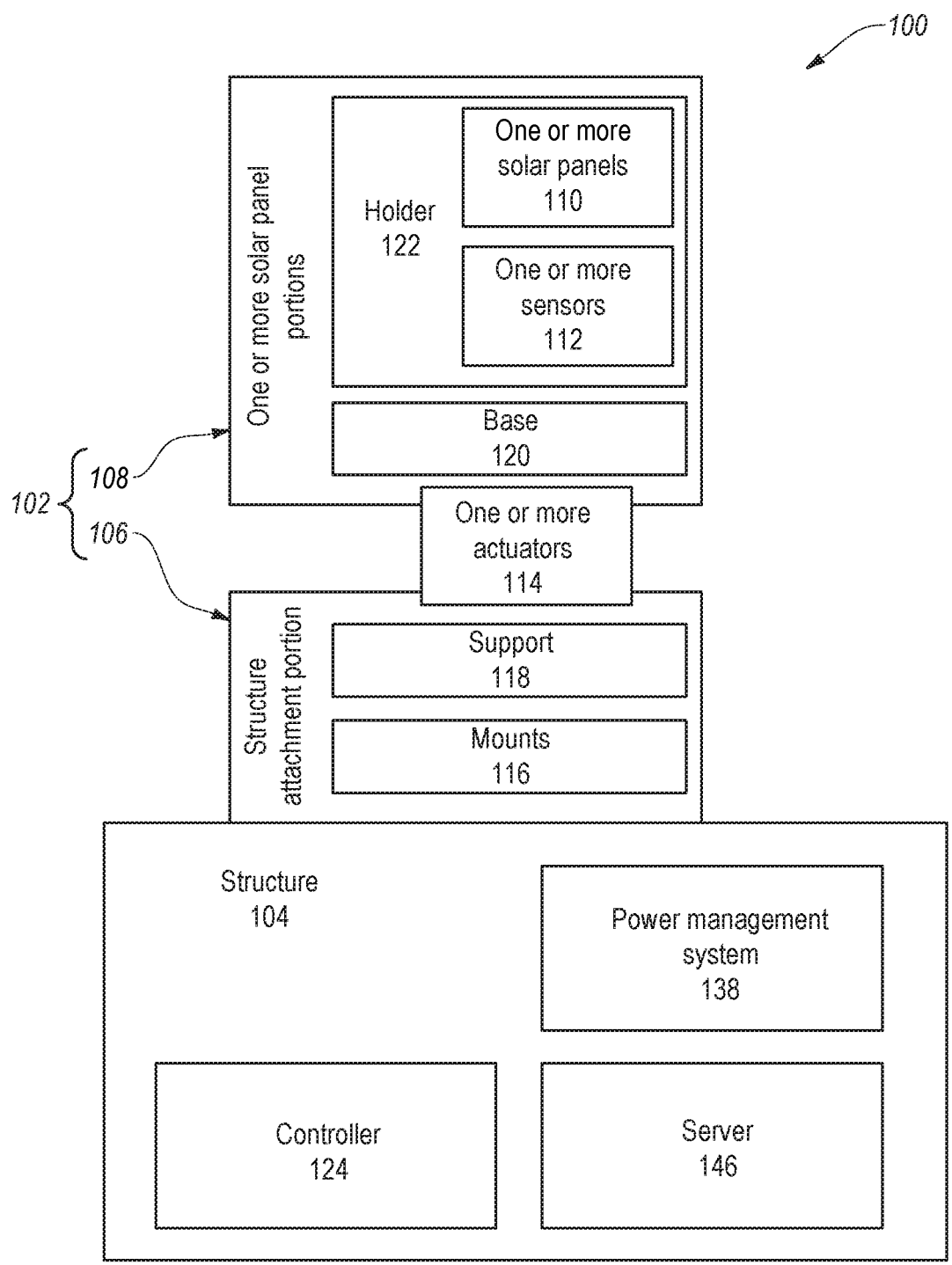
FIG. 1A is a schematic view of a system that includes a solar tracking apparatus, according to an embodiment.

FIG. 1A is a schematic view of a system 100 that includes a solar tracking apparatus 102, according to an embodiment. The solar tracking apparatus 102 is attached to a structure 104 (e.g., a moveable or stationary structure). The solar tracking apparatus 102 includes a structure attachment portion 106 attached to the structure 104 and is configured to not move relative to the structure 104. The solar tracking apparatus 102 also includes at least one solar panel portion 108 attached to the structure attachment portion 106. The solar panel portion 108 is configured to hold one or more solar panels 110 and to move the solar panels 110 relative to the structure attachment portion 106 and the structure 104. The system 100 (e.g., the solar tracking apparatus 102) may also include one or more additional elements, such as the one or more solar panels 110, one or more sensors 112, one or more actuators 114, etc. For simplicity, FIG. 1A only indicates that the solar tracking apparatus 102 includes elements outside of the structure 104. However, it is noted that the solar tracking apparatus 102 may include one or more elements disposed in the structure 104 (e.g., the controller 124 and the power management system 138) or may form part of the structure 104 (see solar tracking apparatus 602 of FIG. 6).

The structure 104 that includes the solar tracking apparatus 102 attached thereto may include any suitable structure. In an embodiment, the structure 104 may include a stationary structure configured to be permanently located. Examples of stationary structures include work site offices, cabins, storage units, sheds, or houses. In an embodiment, the structure 104 may include a moveable structure not permanently located. Examples of moveable structures includes utility trailers, recreational vehicles (RVs), or automobiles.

One problem associated with moveable structures is that the moveable structure may be located in various environments. For example, the moveable structure may be located in a cold, frigid location and, later, located at a warm dusty location. The solar tracking apparatus 102 may be configured to be rugged. The solar tracking apparatus 102 is rugged when the solar tracking apparatus 102 is configured to operate in several environments. For example, the solar tracking apparatus 102 is rugged when the solar tracking apparatus 102 is at least of waterproof, dust proof, rust resistant, configured to operate in cold temperatures (e.g., temperatures less than 0° C., less than −10° C., or less than −25° C.), configured to operate in hot temperatures (e.g., temperatures greater than 30° C., greater than 40° C., or greater than 50° C.), configured to operate in dry and/or humid environments, configured to be exposed to shaking (e.g., caused by moving the moveable structure over rough terrain) without breaking, etc. Further, the solar tracking apparatus 102 may be rugged when the solar tracking apparatus 102 is lightweight. The solar tracking apparatus 102 is lightweight when the solar tracking apparatus 102 exhibits a weight of about 1200 pounds ("lbs") or less, such as about 1000 lbs or less, about 900 lbs or less, about 800 lbs or less, about 700 lbs or less, about 600 lbs or less, about 500 lbs or less, or in ranges of about 200 lbs to about 500 lbs, about 400 lbs to about 600 lbs, about 500 lbs to about 700 lbs, about 600 lbs to about 800 lbs, about 700 lbs to about 900 lbs, or about 800 lbs to about 1000 lbs. The solar tracking apparatus 102 lightweight at least one of facilitates transportation of the solar tracking apparatus 102, enables the solar tracking apparatus 102 to be used with a wider range of structures, or is less likely to break due to shaking.

Another problem associated with moveable structures is that the moveable structures may be located at different locations and/or have different orientations. Unlike stationary structures, the different locations and/or different orientations of the moveable structures may make tracking the sun difficult since the location of the sun relative to the moveable structure depends on the location and orientation of the moveable structure. It may be impossible to predict the location of the sun relative to the moveable structure in advance. However, as discussed in more detail below, the solar tracking apparatus 102 may be configured to compensate for these difficulties using the one or more sensors 112 and information contained in a controller 124 of the solar tracking apparatus 102.

As discussed, the solar tracking apparatus 102 includes a structure attachment portion 106. The structure attachment portion 106 attaches the solar tracking apparatus 102 to the structure 104 and transfers the weight of the solar tracking apparatus 102 to the structure 104. The structure attachment portion 106 may be rigidly attached to the structure 104 so the structure attachment portion 106 substantially does not move relative to the structure 104.

The structure attachment portion 106 includes one or more mounts 116. The mounts 116 of the structure attachment portion 106 directly attach the structure attachment portion 106, and by extension the whole solar tracking apparatus 102, to the structure 104. The mounts 116 may be attached to any portion of the structure 104 that can support the weight of the solar tracking apparatus 102. For example, the mounts 116 may be attached to a weight bearing frame or other structural frame of the structure 104 (e.g., the chassis of a utility trailer or an automobile).

In an embodiment, the structure attachment portion 106 only includes a single mount 116. In such an embodiment, the portion of the structure 104 that the mount 116 is attached to is sufficiently strong to support the whole weight of the structure attachment portion 106. In an embodiment, the structure attachment portion 106 includes a plurality of mounts 116. Selecting the structure attachment portion 106 to include a plurality of mounts 116 allows the structure attachment portion 106 to be attached to multiple locations of the structure 104, thereby distributing the weight of the solar tracking apparatus 102 throughout the structure 104. For example, the plurality of mounts 116 may be attached to various locations along the structure 104 so the structure attachment portion 106 extends along a significantly portion (e.g., at least about 50%, at least about 75%, or at least about 90%) of a length of the structure 104 thereby distributing the weight through the structure 104. Distributing the weight the of the solar tracking apparatus 102 throughout the structure 104 using the plurality of mounts 116 decreases the likelihood that the structure 104 fails due to the weight of the solar tracking apparatus 102, jostling of the solar tracking apparatus 102 caused by moving the structure 104, environmental forces (e.g., wind) exerted onto the solar tracking apparatus 102, etc. Further, distributing the weight of the solar tracking apparatus 102 through the structure 104 is decreases the likelihood that the solar tracking apparatus 102 negatively affects the stability (e.g., balance) of the structure 104, which may be especially important when the structure 104 is a moveable structure.

The mounts 116 may be selected based on the method used to attach the mounts 116 to the structure 104 and/or the method used to attach the mounts 116 to the rest of the solar tracking apparatus 102 (e.g., the supports 118 and/or the solar panel portion 108). In an embodiment, the mounts 116 may be welded to the structure 104 and/or the rest of the solar tracking apparatus 102. In such an embodiment, the mounts 116 may be formed from steel or another weldable material. When the mounts 116 are configured to be welded, the mounts 116 may be substantially free of aluminum because welding aluminum may cause hard cracking, reduce the strength of the mounts 116, and/or specific welding conditions. However, it is noted that the mounts 116 may include aluminum even when the mounts 116 are welded. In an embodiment, the mounts 116 may be bolted, screwed, nailed, or otherwise mechanically attached to the structure 104 and/or the rest of the solar tracking apparatus 102. In such an embodiment, the mounts 116 may define at least one of one or more recesses that extend at least partially through the mounts 116, slots (e.g., the mounts 116 are t-slots), or are sufficiently malleable that the bolt, screw, nail, etc. may be forced through the mounts 116. In an embodiment, the mounts 116 may be attached to the structure 104 and/or the rest of the solar tracking apparatus 102 using any other suitable method, such as with clamps.

In an embodiment, the mounts 116 may be attached to the structure 104 using a first method and the rest of the solar tracking apparatus 102 using a second method that differs from the first method. For example, the mounts 116 may be welded to the structure 104. The mounts 116 may be formed from steel. However, steel is a relatively dense material and forming the entirely of the structure attachment portion 106 from steel may drastically increase the mass of the structure attachment portion 106. As well be discussed in more detail below, the rest of the structure attachment portion 106 may be formed from a lighter material, such as aluminum or a composite. The steel mounts 116 may then be attached to the rest of the solar tracking apparatus 102 using bolts, screws, clamps, etc.

Besides the mounts 116, the structure attachment portion 106 may include one or more supports 118. As used herein, the supports 118 refers to portions of the structure attachment portion 106 that are not mounts 116. The supports 118 may be integrally formed with the mounts 116 or may be distinct from the mounts 116.

The supports 118 are beams (e.g., one or more generally vertical columns, one or more generally horizontal beams) that connect the mounts 116 to one or more portions of the solar tracking apparatus 102 spaced from the mounts 116. For example, at least some of the supports 118 may extend from the mounts 116 and connect the mounts 116 to other portions of the solar tracking apparatus 102. Some of the supports 118 may also be beams connected to and extend between other supports 118.

In an example, the structure attachment portion 106 includes the one or more supports 118 when the solar panel portion 108 is spaced from the one or more mounts 116. In such an example, the structure attachment portion 106 may extend from the mounts 116 to the solar panel portion 108 thereby transferring the weight of the solar panel portion 108 to the mounts 116. In an example, the structure attachment portion 106 include the one or more supports 118 when the mounts 116 includes a plurality of mounts 116 spaced from each other. In such an example, the supports 118 may extend from and between the plurality of mounts 116 connecting the plurality of mounts 116 together. Connecting the plurality of mounts 116 together using the supports 118 allows the weight of the solar tracking apparatus 102 to be distributed between the plurality of mounts 116.

The support 118 may be formed from any suitable material. In an embodiment, the supports 118 may be formed from a material exhibiting a density that is less than steel (e.g., 8.05 g/cm$^3$) to minimize the weight of the structure attachment portion 106. In such an embodiment, the supports 118 may be formed from aluminum, a composite material, wood, or another suitable material. Forming the supports 118 from a material exhibiting a density that is less than steel may drastically decrease the weight of the structure attachment portion 106 since, in some examples, the supports 118 may form a significant portion (e.g., at least 50%, at least 75%, or at least 90%) of the volume of the structure attachment portion 106.

The mounts 116 and the supports 118 may exhibit any suitable cross-sectional shape. However, in an embodiment, the mounts 116 and the supports 118 may exhibit any non-solid cross-sectional shape (e.g., not a solid rectangular or circular cross-sectional shape) to minimize the weight of the mounts 116 and the supports 118. For example, the mounts 116 and the supports 118 may be a hollow structural section beam, an I-beam, a pipe, a L-shaped beam, C-shaped beam, a T-beam, a t-slot, or any other non-solid cross-sectional shaped beam. In an example, the mounts 116 and the supports 118 are t-slot beams since such beams may be easily connected together without welding or without forming openings therein.

As discussed, the solar panel portion 108 is attached to the structure attachment portion 106 so the solar panel portion 108 may move relative to the structure attachment portion 106 and, by extension, move relative to the structure 104. Generally, the solar panel portion 108 is attached to the at least one of the one or more supports 118. However, the solar panel portion 108 may be attached to the mounts 116 when the mounts 116 are adjacent to the solar panel portion 108.

The solar panel portion 108 may be attached to the structure attachment portion 106 using any method that allows the solar panel portion 108 to be moveable relative to the structure attachment portion 106. In an embodiment, as shown, the solar panel portion 108 is coupled to the structure attachment portion 106 using one or more actuators 114. In such an embodiment, the actuators 114 may, for example, include a bearing apparatus that includes a stator attached to the structure attachment portion 106 and a rotor attached to the solar panel portion 108. However, it is noted that the solar panel portion 108 may be moveably attached to the structure attachment portion 106 using other methods. For example, the solar panel portion 108 may be attached to the structure attachment portion 106 using hinges, a bearing apparatus distinct from the one or more actuator 114, an actuator that includes no bearing apparatus (e.g., a piston), or any other suitable method.

In an embodiment, as illustrated, the solar panel portion 108 includes two distinct components, the base 120 and the holder 122. The base 120 may be moveable attached to the structure attachment portion 106 and the holder 122 is moveable attached to the base 120. For example, the base 120 may be coupled to a first actuator configured to move the base 120 relative to the structure attachment portion 106 and the holder 122 is coupled to the a second actuator configured to move the holder 122 relative to the base 120. The first actuator may also be coupled to the structure attachment portion 106 and the second actuator may also be coupled to the base 120. The first actuator may be configured to move the base 120, and by extension the holder 122, in a first direction relative to the structure attachment portion 106. The second actuator may be configured to move the holder 122 relative to the base 120 which causes the holder 122 to move in a second direction relative to the structure attachment portion 106. In an embodiment, the solar panel portion 108 may include only a single component.

The directions that the solar panel portion 108 (e.g., the base 120 and the holder 122) move relative to the structure attachment portion 106 and, by extension the structure 104, may be any suitable direction. The directions that the solar panel portion 108 moves relative to the structure attachment portion 106 will be discussed using an xyz coordinate system. To facilitate discussion, the y-axis is assumed to be generally perpendicular to at least one of gravity, a surface of the structure 104 that is adjacent to the solar panel portion 108, a surface (e.g., ground) that the structure 104 is positioned on, or a surface of the structure attachment portion 106 that the solar panel portion 108 is attached. Using the xyz coordinate system, the solar panel portion 108 may be configured to move at least one of up or down the y-axis, left or right along the x-axis, forwards or backwards along the z-axis, rotate relative to the y-axis (i.e., rotate within a plane defined by the x-axis and the z-axis, also known as an azimuth direction or a yaw), rotate relative to the x-axis (i.e., rotate within a plane defined by the y-axis and the z-axis, also known as an altitude direction or pitch), or rotate relative to the z-axis (i.e., rotate within a plane defined by the x-axis and the y-axis, also known as an altitude direction or roll). It is noted that the altitude direction is used to refer to both rotating relative to the x-axis and the z-axis since the altitude direction refers to tilting the solar panel portion relative to the plane defined by the x-axis and the z-axis. In an embodiment, the solar panel portion 108 is configured to move in both the azimuth direction and the altitude direction since those two directions are sufficient to accurately track the sun throughout the day, assuming there are not obstacles between solar panel portion 108 and the sun. In such an embodiment, referring to the embodiment where the solar panel portion 108 includes the base 120 and the holder 122, the first direction that the base 120 moves relative to the structure attachment portion 106 is the azimuth direction and the second direction that the holder 122 moves relative to the base 120 is the altitude direction.

In an embodiment, the solar panel portion 108 is formed from a plurality of beams connected together to form a frame. Forming the solar panel portion 108 form a plurality of beams may decrease the weight of the solar panel portion 108 compared to, for example, if the solar panel portion 108 was formed from one or more plates. The beams that form the solar panel portion 108 may be the same or similar to the other beams disclosed. For example, the beams that form the solar panel portion 108 may include aluminum or another material exhibiting a density that is less than steel to decrease the overall weight of the solar panel portion 108. In an embodiment, the solar panel portion 108 may exhibiting any other suitable structure other than a plurality of beams. In such an embodiment, for example, the solar panel portion 108 may include a single beam or include one or more plates. It is noted that the structure of the solar panel portion 108 and the materials used to form the solar panel portion 108 may depend on, for example, the mass of the solar panels 110, the environments that the solar tracking apparatus 102 is configured to operate, the wind speeds that the solar tracking apparatus 102 is configured to operate in, etc.

As discussed, the solar panel portion 108 is configured to hold and support the one or more solar panels 110. At least a portion of the solar panel portion 108 may be configured to have the one or more solar panels 110 attached thereto. For example, when the solar panel portion 108 includes the base 120 and the holder 122, the holder 122 may be configured to have the one or more solar panels 110 attached thereto. In an embodiment, the solar panel portion 108 is configured to have the one or more solar panels 110 reversibly attached thereto. As used herein, reversibly attaching the solar panels 110 to the solar panel portion 108 includes any method that allows the solar panels 110 to be detached from the solar panel portion 108 substantially without damaging the solar panels 110 and/or the solar panel portion 108. Reversibly attaching the solar panels 110 to the solar panel portion 108 may allow the solar panels 110 to be removed from the solar panel portion 108 in conditions that may damage the solar panels 110, such as when a moveable structure that includes the solar tracking apparatus 102 is moving or when the system 100 is exposed to high wind speeds. In an example, the solar panel portion 108 is configured to have the solar panels 110 reversibly attached thereto using one or more bolts. In such an example, the solar panel portion 108 may define one or more holes (e.g., at least one of treaded holes or holes that pass therethrough) that allows the bolts to reversibly attach the solar panels 110 to the solar panel portion 108. In an example, the solar panel portion 108 is configured to have the solar panels 110 reversibly attached thereto using one or more clamps. In such an example, at least a portion of the solar panel portion 108 may include one or more locations with the clamps permanently attached thereto or are configured to receive a portion of the clamps. In an embodiment, the solar panel portion 108 is configured to have the one or more solar panels 110 permanently attached thereto. As used herein, permanently attaching the solar panels 110 to the solar panel portion 108 includes any method that may damage the solar panels 110 and/or the solar panel portion 108 when detaching the solar panels 110 from the solar panel portion 108. Permanently attaching the solar panels 110 to the solar panel portion 108 may make operating the solar tracking apparatus 102 easier and minimize damage to the solar panels 110 caused by handling the solar panels 110. The solar panels 110 may be permanently attached to the solar panel portion 108 when, for example, the solar tracking apparatus 102 is configured to be attached to a stationary structure or the solar panels 110 are unlike to be damaged by moving a moveable structure or by high wind speeds. Examples of permanently attaching the solar panels 110 to the solar panel portion 108 includes using an adhesive to attach the solar panels 110 to the solar panel portion 108.

The solar panels 110 of the solar tracking apparatus 102 are configured to provide power to the system 100. For example, the solar panels 110 may be selected to provide enough power to power the solar tracking apparatus 102. The solar panels 110 provide sufficient power to power the solar tracking apparatus 102 when the solar panels 110 provide sufficient power to operate the controller 124 of the solar tracking apparatus 102, power the actuators 114 of the solar tracking apparatus 102, and provide power to the power management system 138 (e.g., power to charge one or more batteries 140). The solar panels 110 also may provide sufficient power to provide power to a server 146, one or more power outputs 148, or any other component electrically coupled to the solar tracking apparatus 102. The power provided by the solar panels 110 to the power outputs 148 may include sufficient power or charge at least one of one or more cellphones, one or more tables, one or more laptops, one or more cameras, or any other device may be plugged into the power outputs 148. In an embodiment, the solar panels 110 are configured to provide at least an average of 50 watts of electrical power when the solar panels 110 directly face the sun on an average sunny day, such as at least about 100 watts, at least about 150 watts, at least about 200 watts, at least about 225 watts, at least about 250 watts, at least about 300 watts, at least about 400 watts, at least about 500 watts, or in ranges of about 50 watts to about 150 watts, about 100 watts to about 200 watts, about 150 watts to about 250 watts, about 200 watts to about 300 watts, about 250 watts to about 400 watts, or about 300 watts to about 500 watts. It is believed by the inventors that solar panels 110 that provide the above amounts of electrical power, especially at electrical powers greater than about 200 watts, will provide power to an average offsite archeological dig team.

The solar panels 110 may be selected to exhibit a weight that is less than 200 lbs, such as less than about 150 lbs, less than about 100 lbs, less than about 75 lbs, less than about 50 lbs, less than about 25 lbs, less than 10 lbs, or in ranges of about 1 lbs to about 15 lbs, about 10 lbs to about 50 lbs, about 25 lbs to about 75 lbs, about 50 lbs to about 100 lbs, or about 75 lbs to about 150 lbs. The solar panels 110 are selected to exhibit such low weights because the weight of the solar panels 110 significantly affects the weight of the solar tracking apparatus 102. For example, increasing the weight of the solar panels 110 requires an increase in the strength of the solar panel portion 108 and the structure attachment portion 106. The increase strength of the solar panel portion 108 and the structure attachment portion 106 may increase the weight of the solar panel portion 108 and the structure attachment portion 106. An increase in the weight of the solar panels 110 may have a drastic effect on the overall weight of the solar tracking apparatus 102.

The solar panels 110 may include any suitable number of solar panels 110. For example, the solar panels 110 may include 1, 2, 3, 4, 5, 6, 7, 8, 9, 10, 11, 12, or greater than 12 solar panels. The number of solar panels 110 that the solar tracking apparatus 102 includes may depend on several factors. For example, the number of solar panels 110 that the solar tracking apparatus 102 includes may depend on the weight of the solar panels 110 and/or the desired wattage of the solar panels 110. In an example, the number of solar panels 110 may depend on the structure 104 that includes the solar tracking apparatus 102. For instance, the surface of the structure 104 that includes the solar tracking apparatus 102 may exhibit a maximum width (e.g., a moveable structure may require the solar tracking apparatus 102 to exhibit, at most, an 8.5 foot width due to road width restrictions), include obstacles, or include locations that must be exposed (i.e., not covered by the solar panels 110). In an example, the number of solar panels 110 in the solar tracking apparatus 102 may depend on the size (e.g., width, height, or thickness) of the solar panels.

In an embodiment, depending on the number of solar panels 110 included in the solar tracking apparatus 102, the solar panels 110 may be arranged in a grid-like arrangement. For example, the solar panels 110 may be arranged in a 1×2 array, a 1×3 array, a 1×4 array, a 2×2 array, a 2×3 array, a 2×4 array, a 3×3 array, a 3×4 array, a 4×4 array, or any other suitable array. The grid-like arrangement of the solar panels 110 may depend on the number of solar panels 110, the maximum width of the solar tracking apparatus 102, the size of the solar panels 110, obstacles on the structure 104, etc.

As discussed, the solar tracking apparatus 102 may include one or more actuators 114 configured to move the solar panel portion 108 in at least two directions relative to the structure attachment portion 106. The actuators 114 may include any suitable actuators. For example, the actuators 114 may include at least one of a hydraulic actuator, a pneumatic actuator, an actuator that includes a piston, an electric motor (e.g., a regenerative electric motor driver to minimize current demand on the power management system 138), a bearing apparatus, etc. In an embodiment, the one or more actuators 114 include only a single actuator configured to move the solar panel portion 108 is the at least two directions relative to the structure attachment portion 106. In an embodiment, the one or more actuators 114 may include a plurality of actuators distinct from each other, such as 2 actuators, 3 actuators, 4 actuators, etc. For example, referring to the embodiment where the solar panel portion 108 includes a base 120 and a holder 122, the actuators 114 may include a first actuator configured to move the base 120 relative to the structure attachment portion 106 and a second actuator configured to move the holder 122 relative to the base 120. The first actuator may include an actuator that includes a bearing assembly (e.g., an electric motor that includes or is mechanically coupled to the bearing assembly) that includes a stator coupled to the structure attachment portion 106 and a rotor coupled to the base 120. The bearing apparatus may allow the base 120 to move in the azimuth direction. The second actuator may include an actuator that includes a piston (e.g., a pneumatic or hydraulic actuator) that is coupled to the base 120 and the holder 122. Activating the piston may cause the holder 122 to move in the altitude direction relative to the base 120 and, by extension, the structure attachment portion 106.

The actuators 114 may be selected to have a maximum tracking error that is less than about 20%, less than about 10%, or less than about 6%. For example, actuators 114 that have a maximum tracking error that is about 10% to about 20% may decrease the efficiency of the solar panels 110 by about 2% to about 10%, actuators 114 that have a maximum tracking error that is about 6% to about 10% may decrease the efficiency of the solar panels 110 by about 1% to about 2%, and actuators 114 that have a maximum tracking error that is less than 6% may decrease the efficiency of the solar panels 110 by at most about 1%.

The solar tracking apparatus 102 includes at least one controller 124 that is operably coupled to one or more component of the solar tracking apparatus 102 and configured to at least partially control the operations of the one or more components that the controller 124 is coupled thereto. In an embodiment, as shown in FIG. 1A, the controller 124 may be disposed in the structure 104. Disposing the controller 124 in the structure 104 may protect the controller 124 from the environments that the structure attachment portion 106 and the solar panel portion 108 are exposed. Further, disposing the controller 124 in the structure 104 may improve the accessibly of the controller 124 than if the controller 124 was disposed outside the structure 104 (e.g., on the structure attachment portion 106 and/or the solar panel portion 108). However, disposing the controller 124 in the structure 104 may require wires (e.g., power wires and/or communication wires) to pass from an interior of the structure 104 to an exterior of the structure 104. Disposing the controller 124 in the structure 104 may require one or more elements (e.g., cord grip glands) to prevent the environment (e.g., rain) from entering an interior of the structure 104. In an embodiment, not shown, the controller 124 may be disposed outside of the structure 104, such as on the structure attachment portion 106 or the solar panel portion 108.

Figure 1B:
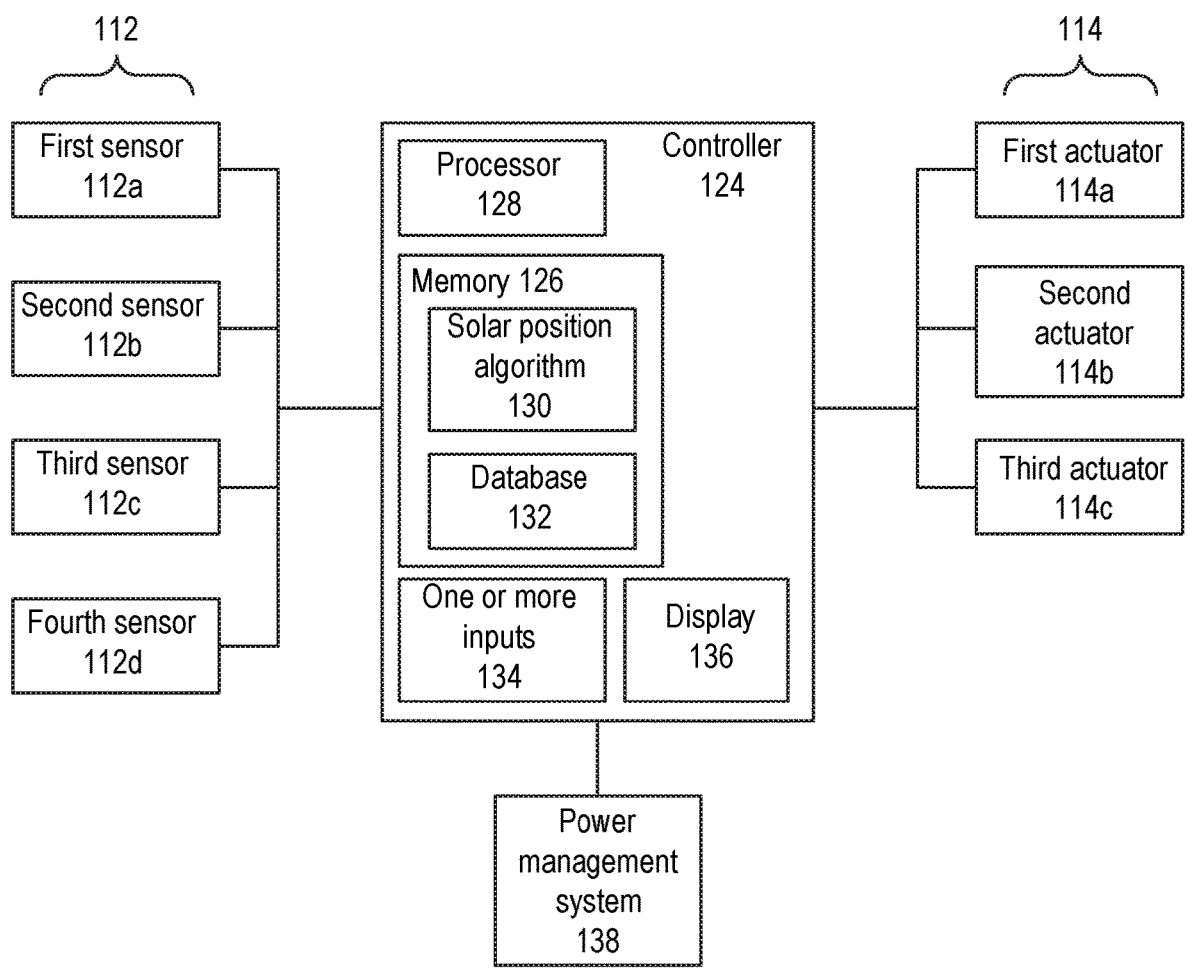
FIG. 1B is a schematic illustration of the controller and one or more components of the solar tracking apparatus to which the controller is coupled, according to an embodiment.

FIG. 1B is a schematic illustration of the controller 124 and one or more components of the solar tracking apparatus 102 to which the controller 124 is coupled, according to an embodiment. The controller 124 includes memory 126 (e.g., non-transitory memory) and a processor 128 coupled to the memory 126. The memory 126 may store one or more instructions thereon and the processor 128 may execute those instructions. Responsive to executing the instructions stored on the processor 128, the processor 128 may at least partially control the one or more components of the solar tracking apparatus 102. The memory 126 may also store information.

In a particular embodiment, the instructions stored on the memory 126 may be configured to track the sun. For example, the instructions stored on the memory 126 may include a solar position algorithm 130 and one or more databases 132 storing information required for the solar position algorithm 130. Examples of the solar position algorithm 130 and the one or more databases 132 stored in the memory 126 are disclosed in Ibrahim Reda and Afshin Andreas, Solar Position Algorithm and Solar Radiation Applications, National Renewable Energy Laboratory (2008), the disclosure of which in incorporated herein, in its entirety, by this reference. It is noted that the memory 126 may store additional instructions and/or information that is used to track the sun. The additional instructions and/or information may include one or more characteristics sensed by the one or more sensors 112, the date and time (e.g., the controller 124 includes time circuitry), elevation, information provided to the controller 124 from an individual using the controller 124 (e.g; geographical information and/or information regarding magnetic north), etc.

The controller 124 may include one or more inputs 134 and one or more displays 136 configured to allow an individual to interact with the controller 124. For example, the one or more inputs 134 may allow the individual to enter information and/or instructions into the controller 124 and the display 136 may provide information to the individual. In an embodiment, the inputs 134 and the display 136 are configured to allow the individual to interact with the controller 124 with the fewest inputs necessary. For example, the inputs 134 and the display 136 can be configured to allow the individual to turn on and start the solar tracking apparatus 102 with either 1 or 2 inputs. The 1 or 2 inputs may include a single button press that turns the solar tracking apparatus 102 on and starts the solar tracking apparatus 102 or a button press than turns the solar tracking apparatus 102 on and another button press that starts the solar tracking apparatus 102. The minimal inputs to turn on and start the solar tracking apparatus 102 may allow at least one of the solar tracking apparatus 102 to be used with individuals who are not "tech-savvy," the solar tracking apparatus 102 to be used to support a primary objective (e.g., an offsite archeological dig) and spending time operating the solar tracking apparatus 102 takes away from the primary objective, different individuals (e.g., the individuals participating in the primary objection) to operate the solar tracking apparatus 102 without requiring each individual to have training to operate the solar tracking apparatus 102, etc.

The inputs 134 of the controller 124 may include any suitable inputs. In an embodiment, the inputs 134 may include a single button that turns on and off the solar tracking apparatus 102 and starts or stops the operation of the solar tracking apparatus. The single button may also operate as a selection button and/or a menu button. In an embodiment, the inputs 134 may include one or more additional inputs 134, such as arrow keys that allow in individual to navigate the menu, a keyboard, etc.

The display 136 of the controller 124 may include any suitable display. In an embodiment, the display 136 may include a simplistic display, such as a two color LED display since such displays may only display text and require relative low amounts of power to operate.

Referring to FIGS. 1A and 1B, the solar tracking apparatus 102 may include one or more sensors 112 communicably coupled to the controller 124. The sensors 112 may be configured to sense one or more characteristics and transmit the sensed characteristics to the controller 124. The controller 124 may then use the sensed characteristics to at least partially control the operation of the solar tracking apparatus 102. In an embodiment, the sensors 112 may include a single sensor. In an embodiment, the sensors 112 may include a plurality of sensors. In such an embodiment, as shown in FIG. 1B, the sensors 112 may include at least one of a first sensor 112a, a second sensor 112b, a third sensor 112c, or a fourth sensor 112d. However, it is noted that the sensors 112 may include fewer than or more than 4 sensors.

The first sensor 112a may include one or more sensors configured to track the position and/or movement of the solar panel portion 108 relative to the structure attachment portion 106 and the structure 104. In an embodiment, the first sensor 112a may be disposed in or attached to the solar panel portion 108. In such an embodiment, the first sensor 112a may include an accelerometer configured to measure the altitude direction that at least a portion of the solar panel portion 108 moves, another tilt meter, a magnetometer (e.g., a compass or fluxgate sensor) that is configured to measure the azimuth direction that at least a portion of the solar panel portion 108 moves, a gyroscopic sensor, a capacitive displacement sensor, an inclinometer, or any other suitable sensor. In an embodiment, the first sensor 112a may be spaced from the solar panel portion 108 (e.g., attached to the structure attachment portion 106 or the structure 104). In such an embodiment, the first sensor 112a may include an optical sensor that images the solar panel portion 108 and the sensed image is used to track the movement of the solar panel portion 108. The first sensor 112a may include a single sensor or a plurality of sensors. When the first sensor 112a includes a plurality of sensors, the plurality of sensors may be spaced from each other or may be integrally formed together (e.g., the first sensor 112a may include an accelerometer and a magnetometer formed on the same circuit board).

The second sensor 112b may include one or more sensors configured to determine the geographical location of the solar tracking apparatus 102. Examples of the second sensor 112b may include at least one of a global positioning system ("GPS") receiver or similar sensor (e.g., GLONASS sensor, BeiDou Navigational Satellite System receiver, etc.), an altimeter, or another suitable sensors. The second sensor 112b may be disposed in the structure 104 which, similar to the controller 124, may protect the second sensor 112b from the environment that the exterior of the structure 104 is exposed. In an embodiment, the controller 124 may include the second sensor 112b integrally formed therewith.

The third sensor 112c may include one or more sensors configured to visually track the sun. The third sensor 112c may track the location of the sun and help orient the solar panels 110 towards the sun. However, the third sensor 112c should be used with the solar position algorithm 130 since the third sensor 112c may have difficulty tracking the sun when the sun is obscured by clouds. Examples of the third sensor 112c may include an optical sensor (e.g., light intensity sensor). In an embodiment, the third sensor 112c may be disposed on the solar panel portion 108 and face the direction that the solar panels 110 face. In an embodiment, the third sensor 112c may be disposed on the structure 104 or the structure attachment portion 106 and have a known location relative to the solar panel portion 106.

The fourth sensor 112d may include one or more meteorological sensors configured to sense one or more characteristics of the environment to which the solar tracking apparatus 102 is exposed. Examples of meteorological sensors include a wind gauge, a temperature sensor, a rain gauge, etc. The meteorological sensors may be used, with the controller 124, to provide warnings for and/or protect the solar tracking apparatus 102 from extreme weather conditions. For example, the fourth sensor 112d may include a wind gauge. Upon detecting a wind speed with the wind gauge that is greater than certain value (e.g., greater than about 15 miles per hour ("mph"), greater than about 20 mph, greater than about 25 mph, or greater than about 30 mph), the controller 124 may direct the actuators 114 to position the solar panel portion 108 so the solar panels 110 are generally horizontal, generally parallel to a surface of the structure 104 adjacent to the solar panels 110, or otherwise position the solar panel portion 108 so the solar panels 110 do not act as sails thereby decreasing the likelihood that the wind causes the solar tracking apparatus 102 to fail.

The solar tracking apparatus 102 may include one or more additional sensors, without limitation. For example, the solar tracking apparatus 102 may include a force sensor (e.g., strain gauge), a level, a flame detection sensor, a proximity sensor, etc.

In an embodiment, the controller 124 may be configured to control the operation of the solar tracking apparatus 102 with almost no interaction for an individual. The controller 124 may control the operation of the solar tracking apparatus 102 with almost no interaction from an individual when the controller 124 may control the operation of the solar tracking apparatus 102 with no input from the individual except for turning on the solar tracking apparatus 102 and, optionally, an additional input to start the operation. Instead, the solar position algorithm 130, the databases 132, and the sensors 112 are sufficient for the controller 124 to control the operation of the solar tracking apparatus 102 with no more input, thereby allowing the individual operating the solar tracking apparatus 102 to focus on the primary objective, as previous discussed.

Referring back to FIG. 1B, as discussed, the controller 124 may at least partially control the one or more actuators 114. The actuators 114 may move the solar panel portion 108 relative to the structure attachment portion 106 responsive to direction from the controller 124. In the illustrated embodiment, the actuators 114 includes at least one of a first actuator 114a, a second actuator 114b, and a third actuator 114c. However, the actuators 114 may include fewer than or more than three actuators. In a particular embodiment, the first actuator 114a may configured to move the solar panel portion 108 (e.g., the base 120) in the azimuth direction, the second actuator 114b may be configured to move the solar panel portion 108 (e.g., the holder 122) in the altitude direction, and the third actuator 114c may be configured to move the solar panel portion 108 up and/or down.

Figure 1C:
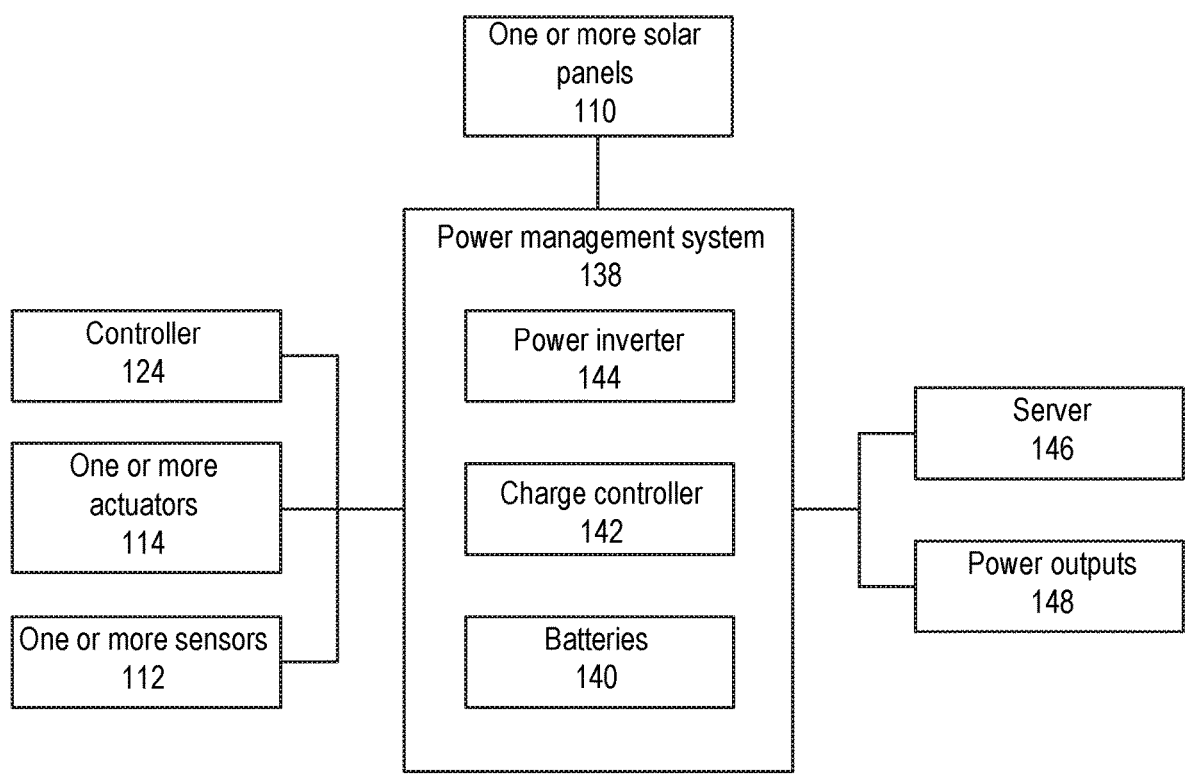
FIG. 1C is a schematic illustration of a power management system and one or more components of the solar tracking apparatus that are operably coupled to the power management system, according to an embodiment.

The controller 124 may also at least partially control the power management system 138. FIG. 1C is a schematic illustration of the power management system 138 and the one or more components of the solar tracking apparatus 102 that are operably coupled to the power management system 138, according to an embodiment. The power management system 138 is electrically coupled to and configured to receive electrical power from the solar panels 110. In an embodiment, the power management system 138 is configured to store the electrical power received from the solar panels 110. In such an embodiment, the power management system 138 may include one or more batteries 140 (e.g., an array of batteries) and a charge controller 142 configured to at least partially control the charging and discharging of the batteries 140. It is noted that the power management system 138 may include one or more other energy storage devices (e.g., capacitors) instead of or in conjunction with the batteries 140. In an embodiment, the power management system 138 may also be configured to provide power to one or more components. In such an embodiment, the power management system 138 may include a power inverter 144.

The power management system 138 may be electrically coupled to one or more components of the solar tracking apparatus 102 which allows power management system 138 to provide electrical power to the components. For example, the power management system 138 may be electrically coupled to the controller 124, the one or more sensors 112, the one or more actuators 114, and, the server 146. The power management system 138 may also be electrical coupled to one or more power outputs 148. The one or more power outputs 148 may include receptacles (e.g., 3-prong receptacles) or female USB outlets configured to have one or more cords plugged. The one or more power outputs 148 may be configured to charge or provide electrical power to laptops, cellphones, tablets, cameras, etc.

Referring to FIG. 1A, the system 100 may include a server 146. The server 146 may be configured to provide a local intranet that wireless connects to one or more personal devices (e.g., cellphones, tablets, cameras, etc.) and to provide a location to store electronic documents. For example, the solar tracking apparatus 102 may be used in offsite archeological digs. In such an example, individuals working on the offsite archeological sites may use the personal devices to record information gathered from the offsite archeological sites. The server 146 provides a method to connect the personal devices together and provides a location to store gathered information. The server 146 may be electrical coupled to the one or more solar panels 110 (e.g., via the power management system 138) so the server 146 may receive electrical power to operate.

The solar tracking apparatus 102 may include one or more additional components not illustrated in FIGS. 1A-1C. In an embodiment, the solar tracking apparatus 102 may include a cover that may be disposed over one or more components of the solar tracking apparatus 102. The cover may protect the one or more components of the solar tracking apparatus 102 from moisture (e.g., rain), from wear caused by dust, during transportation, etc. In an embodiment, the solar tracking apparatus 102 may include one or more wipes or cleaning apparatuses configured to clean (e.g., automatically clean) the solar panels 110 since dirt and other elements on the solar panels 110 may decrease the efficiency of the solar panels 110. In an embodiment, the solar tracking apparatus 102 may include one or more spacers that are configured to be disposed between portions of the structure attachment portion 106 and the solar panel portion 108 not attached together. The spacers may be disposed between the portions of the structure attachment portion 106 and the solar panel portion 108 not attached together to prevent the solar panel portion 108 from wobbling, for example, while the structure 104 moves. The spacers may include, for example, blocks or any other suitable structure. The spacers may also include clamps, straps, or any other mechanism that connects the spacers to at least one of the structure attachment portion 106 or the solar panel portion 108 so the spacers are not shaken free while the structure 104 moves.

Figure 2A:
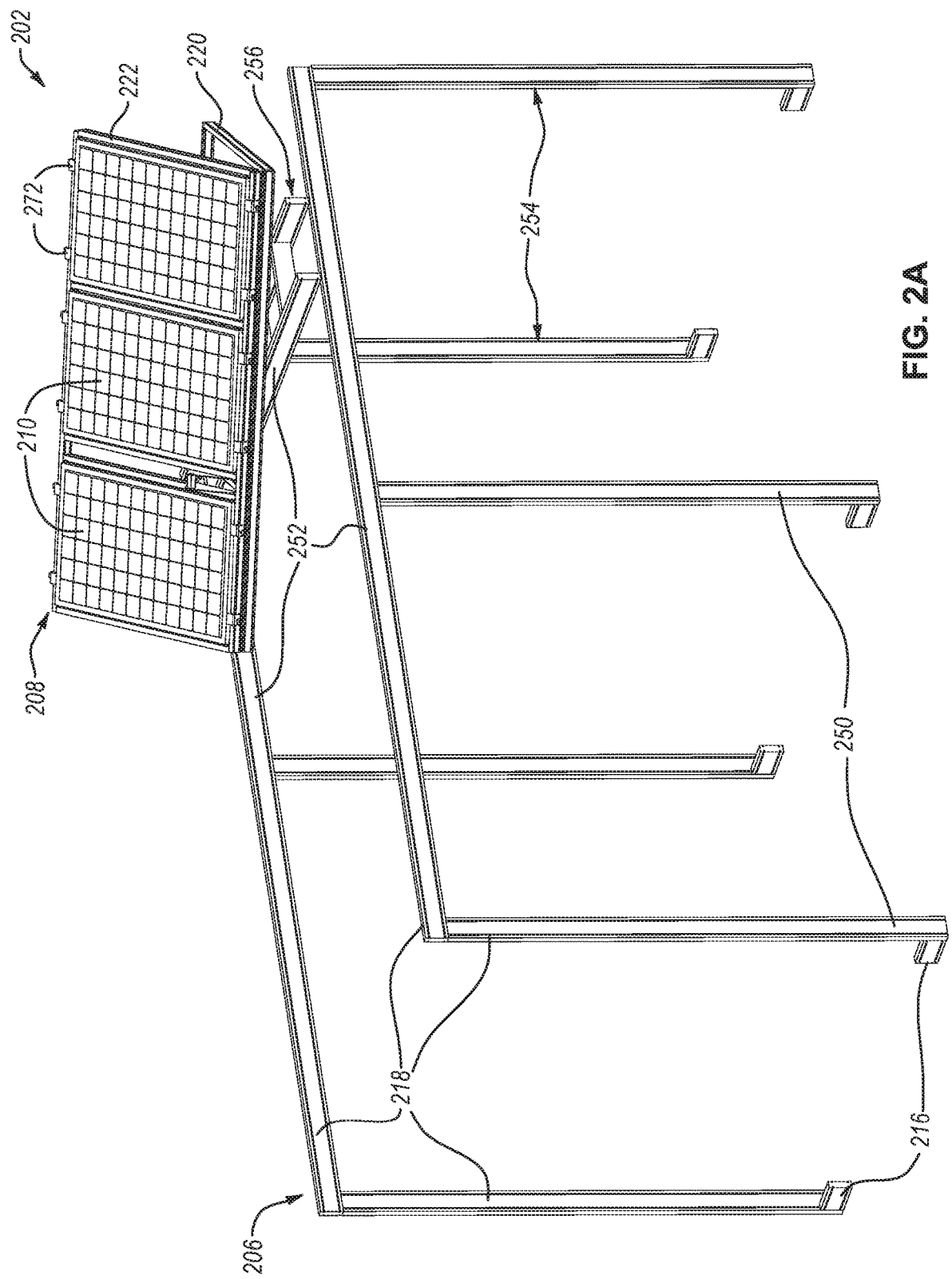
FIG. 2A is an isometric view of a solar tracking apparatus detached from a structure (not shown), according to an embodiment.

FIG. 2A is an isometric view of a solar tracking apparatus 202 detached from a structure (not shown), according to an embodiment. Except as otherwise disclosed, the solar tracking apparatus 202 is the same as or substantially similar to the solar tracking apparatuses disclosed. For example, the solar tracking apparatus 202 may include a structure attachment portion 206 and a solar panel portion 208.

The structure attachment portion 206 includes a plurality of mounts 216. The mounts 216 may include, for example, steel mounts 216 configured to be welded to the chassis of a utility trailer or other moveable structure. However, in the illustrated embodiment, the mounts 216 are spaced from the solar panel portion 208. The structure attachment portion 206 may include a plurality of supports 218 extending from the mounts 216 to the solar panel portion 208. The supports 218 includes a plurality of generally vertically extending columns 250 extending from the mounts 216 and a plurality of generally horizontally extending beams 252 extending between the columns 250. Due to the relative volume of the supports 218 relative to the volume of the mounts 216, in an embodiment, the supports 218 may be formed from a material exhibiting a density that is less than the density of the mounts 216 whereas the mounts 216 may be formed of any material that facilitates attachment to the structure.

In the illustrated embodiment, the structure attachment portion 206 may include two lateral portions 254. Each of the two lateral portions 254 of the structure attachment portion 206 may include the mounts 216 and the supports 218. The structure attachment portion 206 may also include a connecting portion 256 extending between and attached to the two lateral portions 254. The connecting portion 256 may also be directly coupled to the solar panel portion 208 and transfers the weight of the solar panel portion 208 to the two lateral portions 254.

Figure 2B:
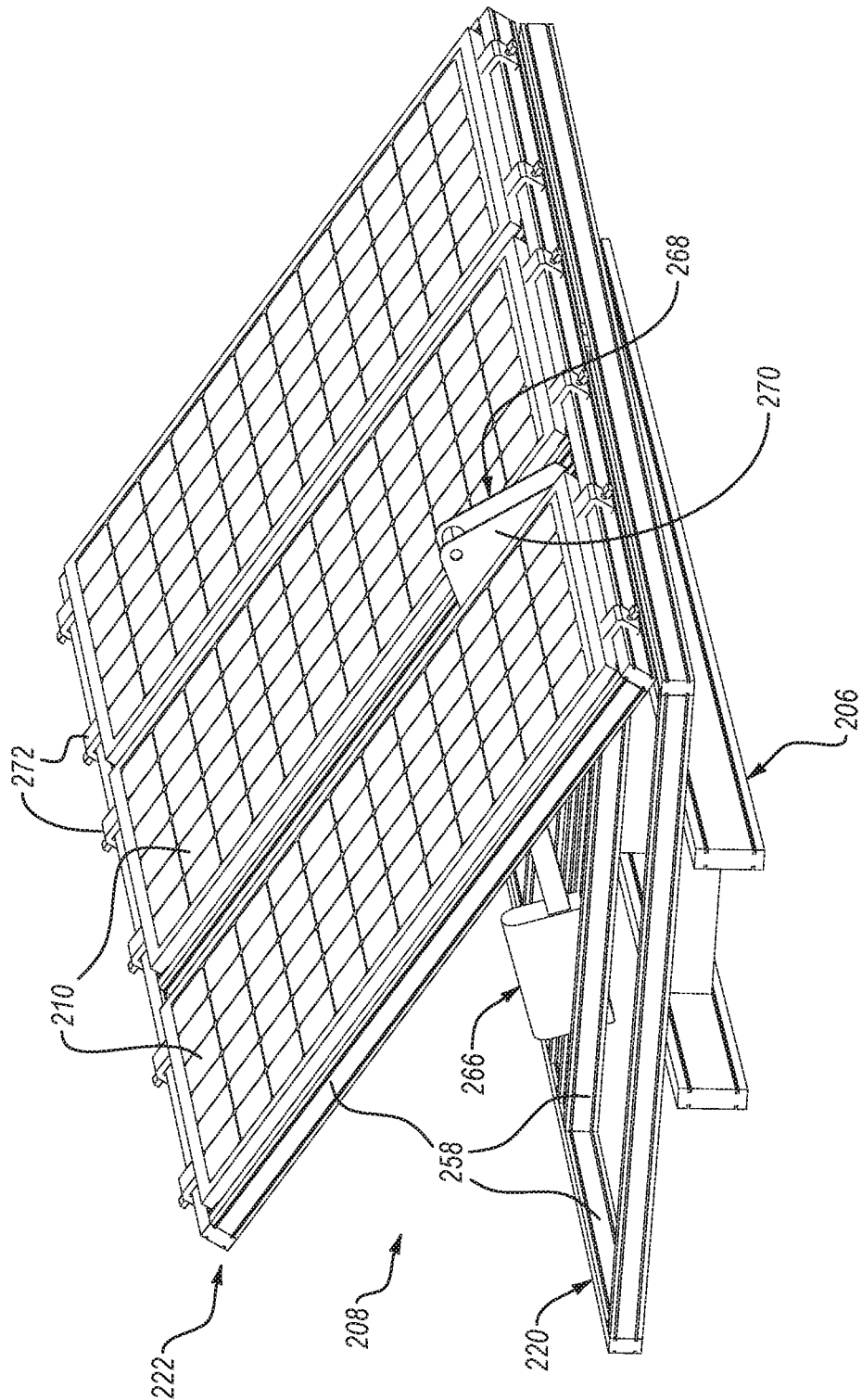
FIGS. 2B and 2C are isometric views of the front side and back side of the solar panel portion, according to an embodiment.
Figure 2C:
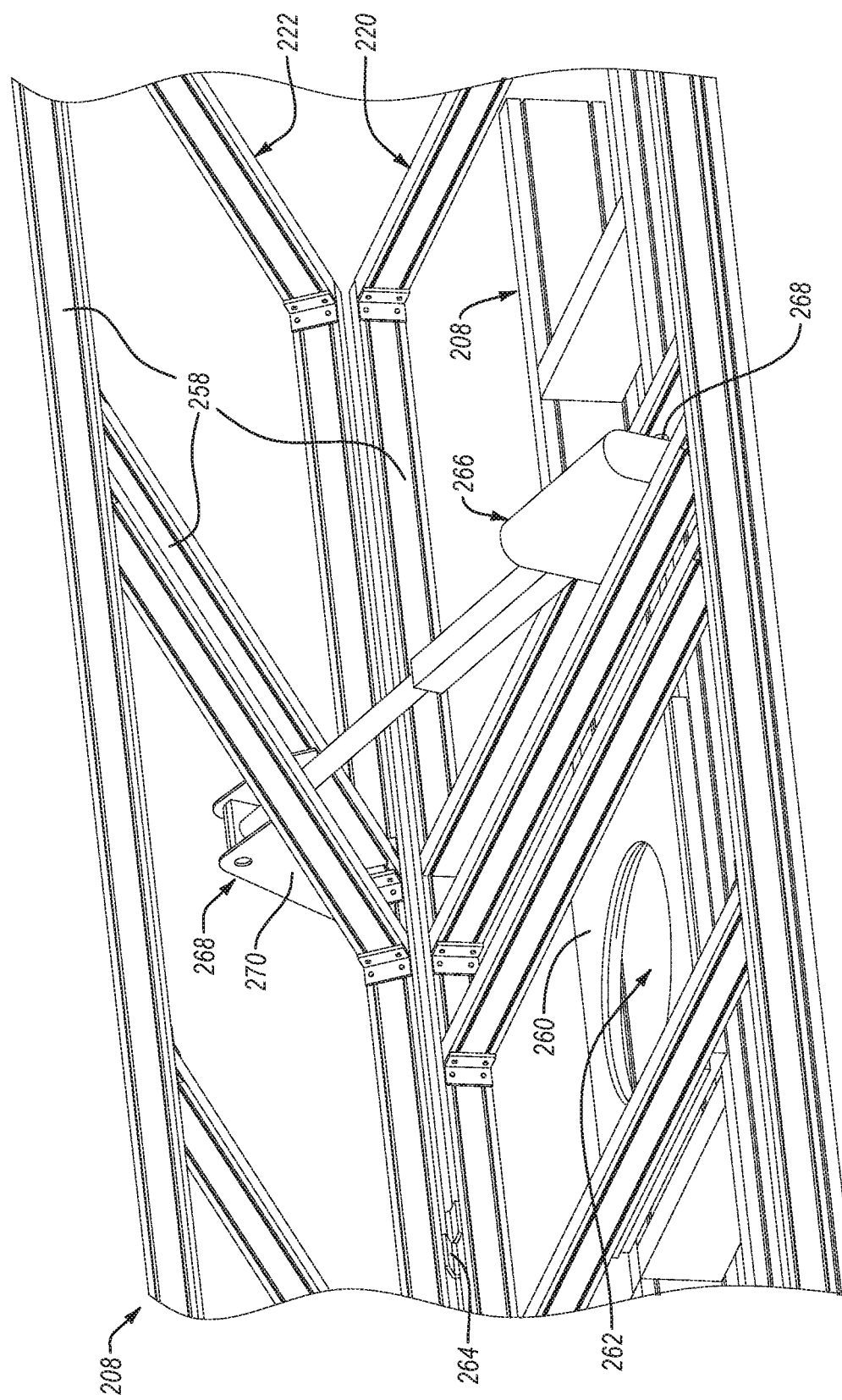

FIGS. 2B and 2C are isometric views of the front side and back side of the solar panel portion 208, according to an embodiment. The illustrated solar panel portion 208 includes a base 220 and a holder 222 coupled to the base 220. Each of the base 220 and the holder 222 are formed from a plurality of beams 258 connected together. The beams 258 of the solar panel portion 208 provide strength of the solar panel portion 208 while decreasing the weight of the solar panel portion 208 than if the solar panel portion 208 was formed from plates.

As discussed, the base 220 is configured to move (e.g., in the azimuth direction) relative to the structure attachment portion 206. The base 220 is coupled to a first actuator (not shown to illustrate the structure of the base 220) that is configured to move the base 220 relative to the structure attachment portion 206. The first actuator may be coupled to the structure attachment portion 206 or the structure. The base 220 may be configured to be attached to the first actuator. For example, the base 220 may include a first actuator attachment component 260 configured to be coupled to the first actuator. In the illustrated embodiment, the first actuator attachment component 260 is a plate extending between the beams 258. When the first actuator includes a bearing apparatus, the first actuator attachment component 260 may define a hole 262 configured to have the bearing apparatus disposed. It is noted that the first actuator attachment component 260 may include other structures other that the plate shown in FIG. 2C. For example, the first actuator attachment component 260 may merely include one or more beams 258 configured to be attached to the first actuator.

As discussed, the holder 222 is configured to move relative to the base 220. The holder 222 is coupled to the base 220 using at least one hinge 264 (shown in FIG. 2C) or other mechanism that allows the holder 222 to move relative to the base 220. The holder 222 may also include a second actuator 266 (e.g., a piston) that couples the holder 222 to the base 220 and is configured to move the holder 222 relative to the base 220. Both the base 220 and the holder 222 may include one or more second actuator attachment components 268 configured to attach the second actuator 266 to the base 220 and the holder 222. In an example, as shown regarding the holder 222, the second actuator attachment components 268 may include one or more plates 270 extending from the beams 258 attached to the second actuator 266 using a hinge. In an example, as shown regarding the base 220, the second actuator attachment components 268 may include a hinge that directly connects the second actuator 266 to the beams 258. In an example, the second actuator 266 may be connected to the base 220 and/or the holder 222 using any other suitable method.

Referring to FIG. 2B, as discussed, the holder 222 may include one or more solar panels 210 attached thereto. The solar panels 210 may be attached to the holder 222 in a grid-like arrangement, such as a 1×3 grid-like arrangement. In an embodiment, the solar panels 210 may be reversibly attached to the holder 222 using any suitable method. For example, as illustrated, the solar panels 210 may be reversibly attached to the holder 222 using one or more clamps 272. The clamps 272 may be integrally formed with the solar panels 210, the holder 222, or may be distinct from both the solar panels 210 and the holder 222. In an embodiment, the solar panels 210 may be permanently attached to the holder 222. It is noted that the solar panels 210 are not illustrated in FIG. 2C to better illustrate the second actuator attachment component 268.

Figure 3A:
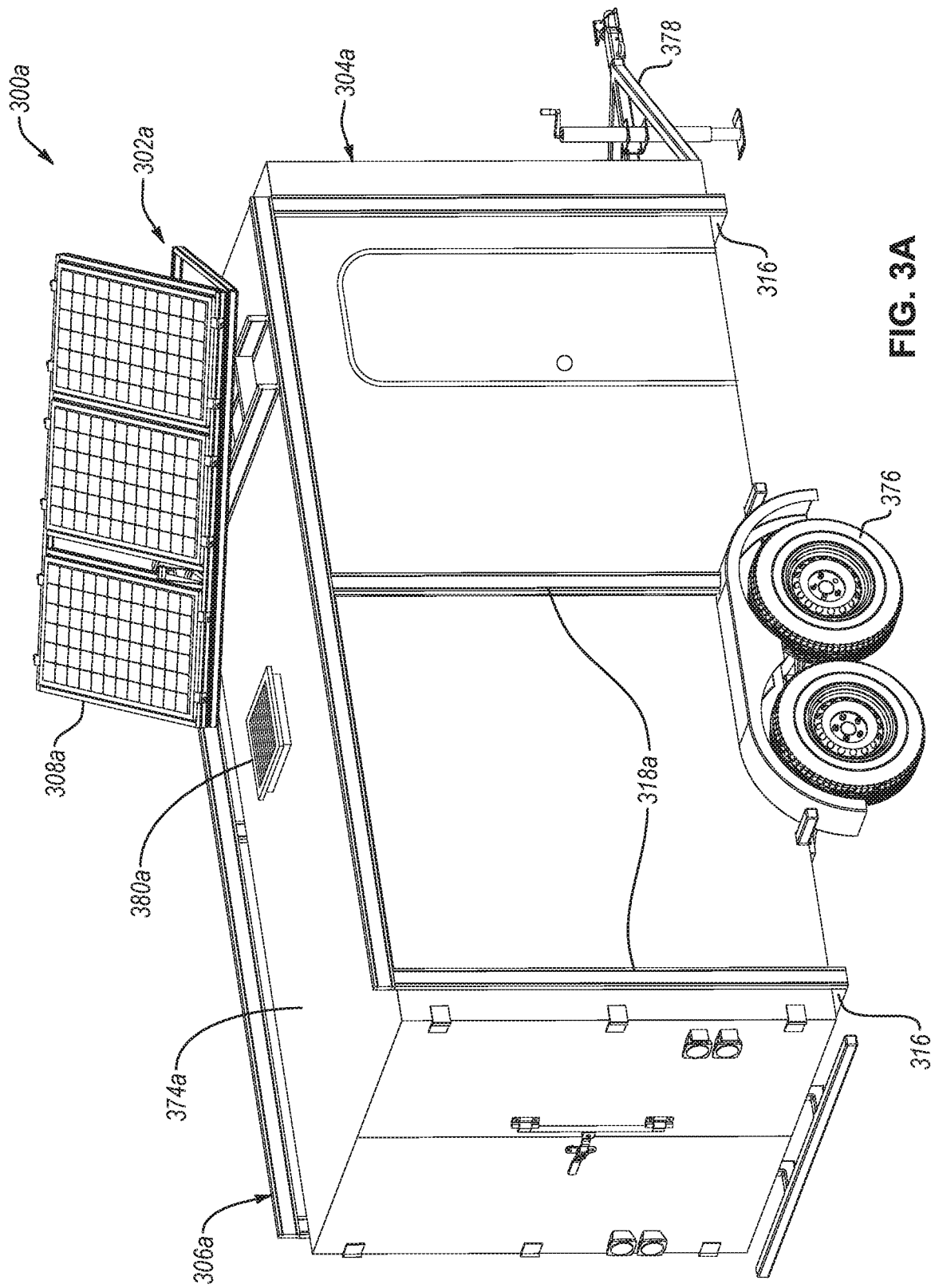
FIG. 3A is an isometric view of a system that includes a solar tracking apparatus coupled to a moveable structure, according to an embodiment.

FIG. 3A is an isometric view of a system 300a that includes a solar tracking apparatus 302a coupled to a moveable structure 304a, according to an embodiment. Except as otherwise disclosed, the system 300a, the solar tracking apparatus 302a, and the moveable structure 304a may be the same as or substantially similar to the systems, solar tracking apparatuses, and moveable structures, respectively, disclosed herein.

In the illustrated embodiment, the moveable structure 304a is a utility trailer since utility trailers are often used in offsite archeological digs, construction sites, and other locations that may require solar power. However, it is noted that the moveable structure 304a may include any other suitable moveable structure, without limitation.

In the illustrated embodiment, the structure attachment portion 306a of the solar tracking apparatus 302a is attached to the chassis (not shown, obscured) of the moveable structure 304a using one or more mounts 318a since the other portions of the moveable structure 304a may not support the weight of the solar tracking apparatus 302a. The structure attachment portion 306a may also include one or more supports 318a extending from the mounts 316 to the solar panel portion 308a since the solar panel portion 308a is disposed on a top surface 374a of the moveable structure 304a.

The position of the solar panel portion 308a relative to the moveable structure 304a may be selected based on several factors. For example, the solar panel portion 308a is positioned on a forward portion of the moveable structure 304a so the solar panel portion 308a is between the wheels 376 and the tongue 378 of the moveable structure 304a which may improve stability (e.g., prevent tipping) of the moveable structure 304a. Further, the position of the solar panel portion 308a may be selected to avoid covering or blocking one or more obstacles 380a (e.g., vent) of the moveable structure 304a.

Figure 3B:
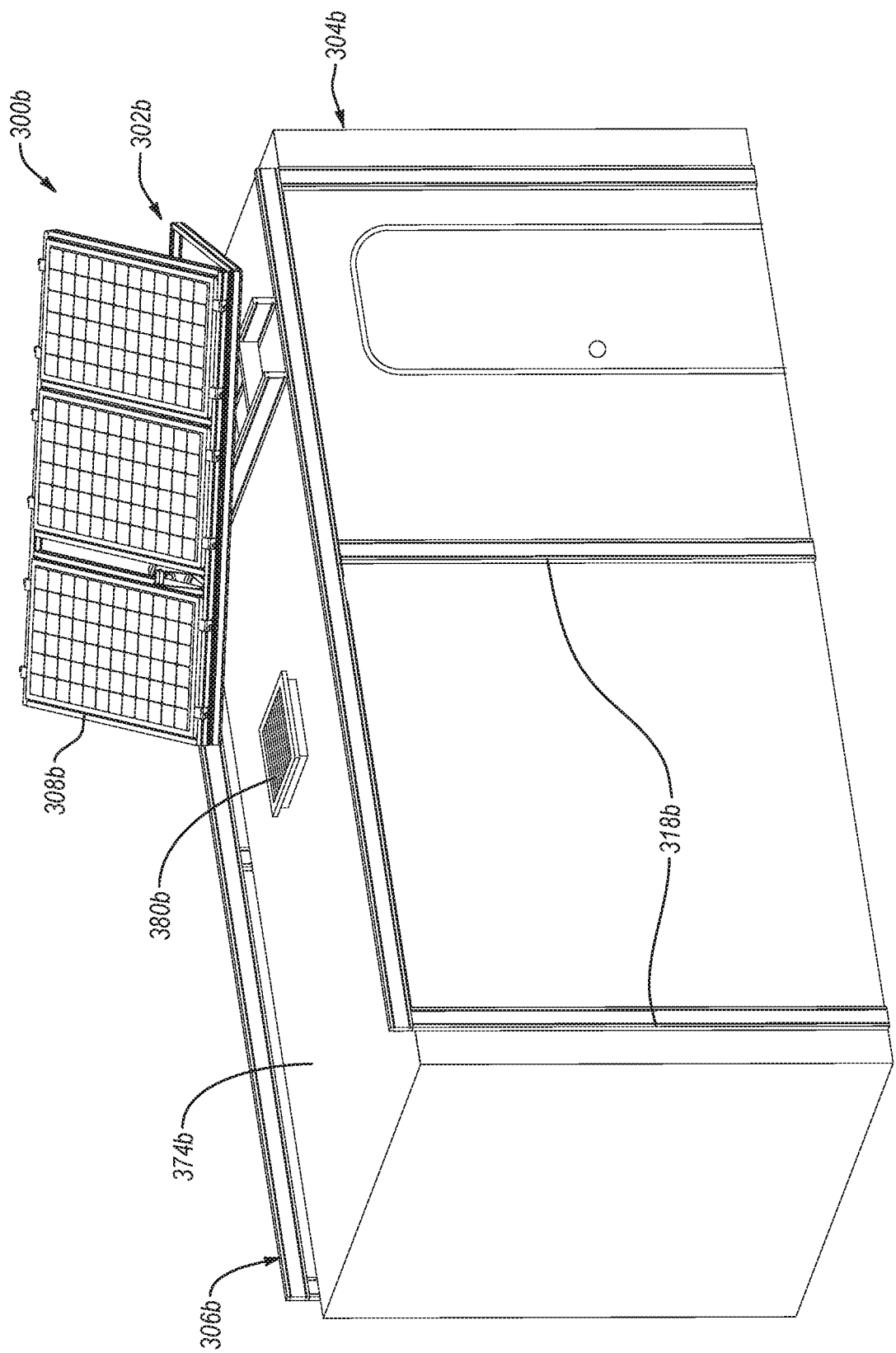
FIG. 3B is an isometric view of a system that includes a solar tracking apparatus coupled to a stationary structure, according to an embodiment.

FIG. 3B is an isometric view of a system 300b that includes a solar tracking apparatus 302b coupled to a stationary structure 304b, according to an embodiment. Except as otherwise disclosed, the system 300b, the solar tracking apparatus 302b, and the stationary structure 304b may be the same as or substantially similar to the systems, solar tracking apparatuses, and stationary structures, respectively, disclosed herein.

In the illustrated embodiment, the stationary structure 304b is a shed since sheds are often used in offsite archeological sites, construction sites, and other locations that may require solar power. However, it is noted that the stationary structure 304b may include any other suitable stationary structure, without limitation.

In the illustrated embodiment, the structure attachment portion 306b of the solar tracking apparatus 302b is attached to the foundation (not shown, buried) of the stationary structure 304b using one or more mounts (not shown, buried) since the other portions of the stationary structure 304b may not support the weight of the solar tracking apparatus 302b. The structure attachment portion 306b may also include one or more supports 318b extending from the mounts to the solar panel portion 308b since the solar panel portion 308b is disposed on a top surface 374b of the stationary structure 304b.

The position of the solar panel portion 308b relative to the stationary structure 304b may be selected based on several factors. For example, the position of the solar panel portion 308b may be selected to avoid covering one or more obstacles 380b (e.g., vent) of the stationary structure 304b.

Referring to FIG. 3A, the solar tracking apparatus 302a may be configured to be expandable (e.g., increase the wattage generated by the solar panels by at least 10%, at least 25%, at least 33%, at least 50%, at least 100%, at least 150%, or at least 200%). The solar tracking apparatus 302a is expandable when the solar tracking apparatus 302a can be modified to include one or more additional solar panel portions (e.g., the solar tracking apparatus 302a includes a plurality of solar panel portions) or the solar panel portion 308a may be expanded to include additional solar panels (e.g., the solar panel portion 308a may be expanded to include a 2×3 grid arrangement of solar panels). The solar tracking apparatus 302a is also expandable when the structure attachment portion 306a can support the additional weight of the additional solar panels. Further, to expand the solar tracking apparatus 302a, the structure 304a that includes the solar tracking apparatus 302a must have sufficient space for the additional solar panels.

Figure 4:
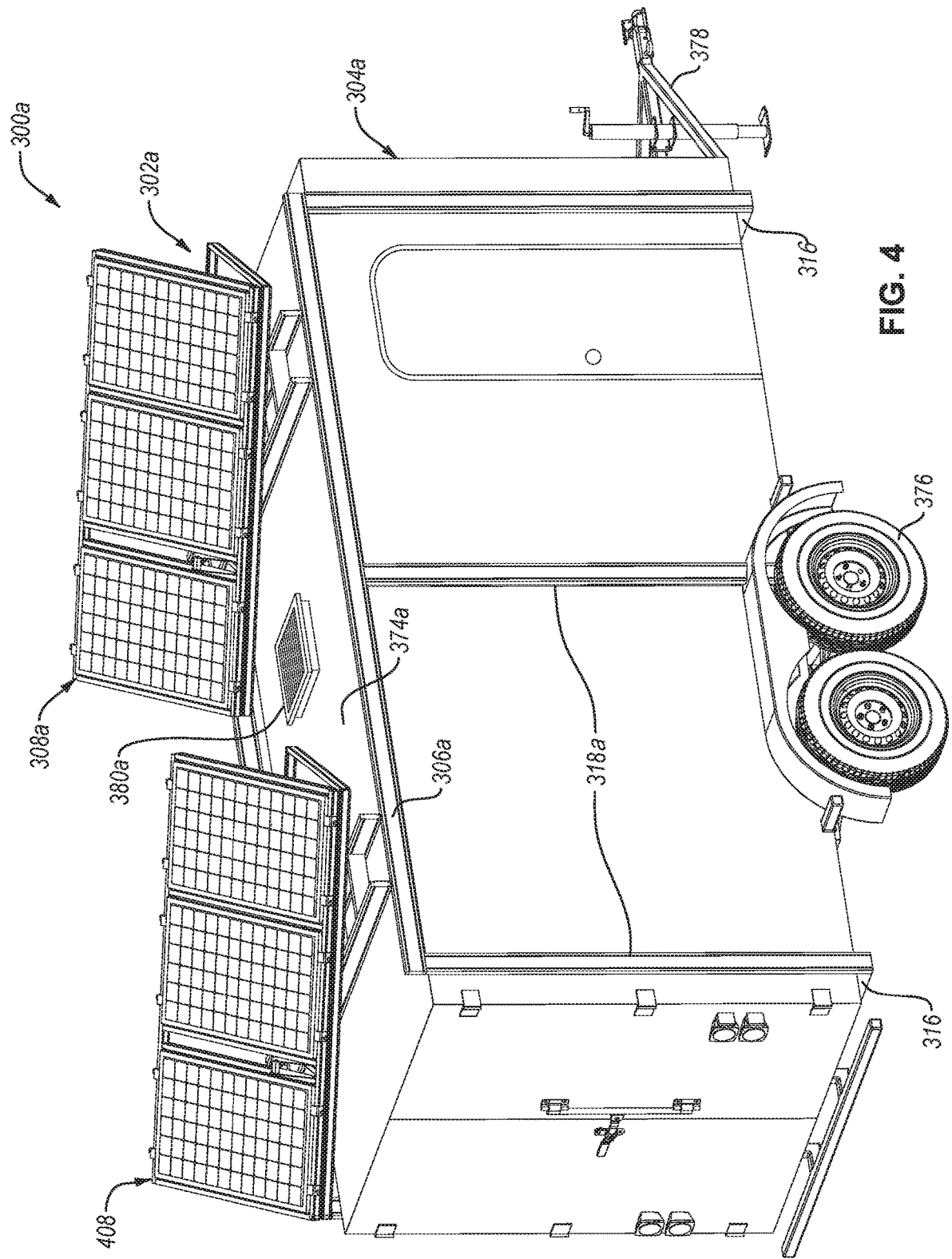
FIG. 4 is an isometric view of the system shown in FIG. 3A after the solar tracking apparatus is expanded, according to an embodiment.

FIG. 4 is an isometric view of the system 300a shown in FIG. 3A after the solar tracking apparatus 302a is expanded, according to an embodiment. For example, the system 300a shown in FIG. 4 include an additional solar panel portion 408 besides the solar panel portion 308a. The additional solar panel portion 408 is attached to the structure attachment portion 306a and may be the same or substantially similar to the solar panel portions disclosed. For example, the additional solar panel portion 408 may be the same as or substantially similar to the solar panel portion 308a. In such an example, the additional solar panel portion 408 may increase the wattage generated by the solar tracking apparatus 302a by about 100%. In an embodiment, the additional solar panel portion 408 may operate independently relative to the solar panel portion 308a.

The position of the additional solar panel portion 408 relative to the structure 304a may be selected based on several factors. For example, the additional solar panel portion 408 is positioned on a back portion of the structure 304a so the additional solar panel portion 408 is opposite the solar panel portion 308a. The additional solar panel portion 408 does not significantly affect the stability of the structure 304a since the solar panel portion 308a is located on the forward portion of the structure 304a to balance the additional weight of the additional solar panel portion 408. Further, the position of the solar panel portion 308a may be selected to avoid covering one or more obstacles 380a (e.g., vent) of the moveable structure 304a.

Figure 5:
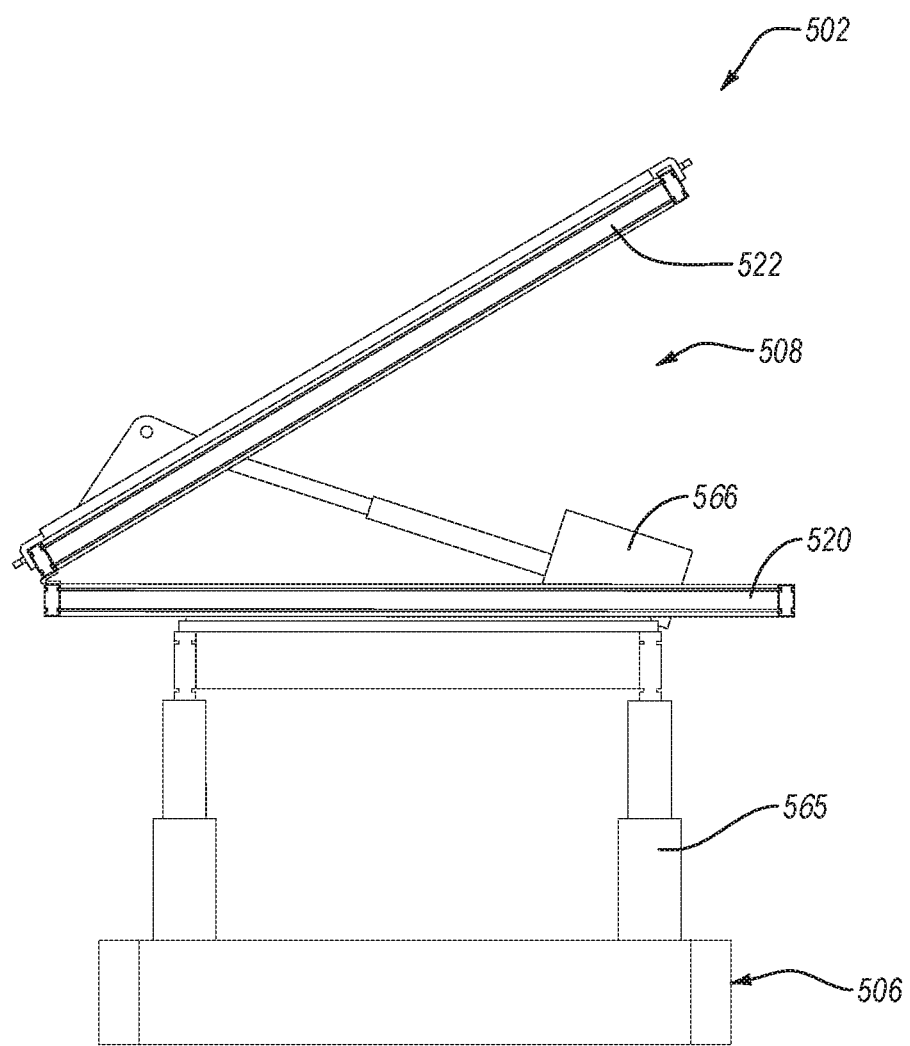
FIG. 5 is a schematic side view of at least a portion of a solar tracking apparatus, according to an embodiment.

As discussed, the solar tracking apparatuses disclosed may include one or more actuators that differ from the actuators discussed in relation to FIGS. 2A-4. For example, FIG. 5 is a schematic side view of at least a portion of a solar tracking apparatus 502, according to an embodiment. Except as otherwise disclosed, the solar tracking apparatus 502 may be the same as or substantially similar to the solar tracking apparatuses disclosed. For example, the solar tracking apparatus 502 may include a structure attachment portion 506 configured to be attached to a structure (not shown) and a solar panel portion 508 configured to move relative to the structure attachment portion 506.

The solar panel portion 508 may include at least a first actuator 565 and a second actuator 566 configured to move the solar panel portion 508 relative to the structure. For example, the first actuator 565 may include an actuator that moves the solar panel portion 508 up and/or down. For example, the first actuator 565 may raise the solar panel portion 508 above some obstacles, such a trees. In an example, the first actuator 565 may include one or more of at least one telescoping actuator, at least one actuator with a piston, at least one pneumatic actuator, or at least one hydraulic actuator. The second actuator 566 may be the same or similar to the second actuator 266 of FIGS. 2A-2C. For example, the solar panel portion 508 may include a base 520 and a holder 522 and the second actuator 566 may be configured to move the holder 522 in the altitude direction relative to the base 520. Although not shown, it is noted that the solar tracking apparatus 502 may include one or more additional actuators, such an actuator configured to move the solar panel portion 508 in the azimuth direction relative to the structure attachment portion 506.

Figure 6:
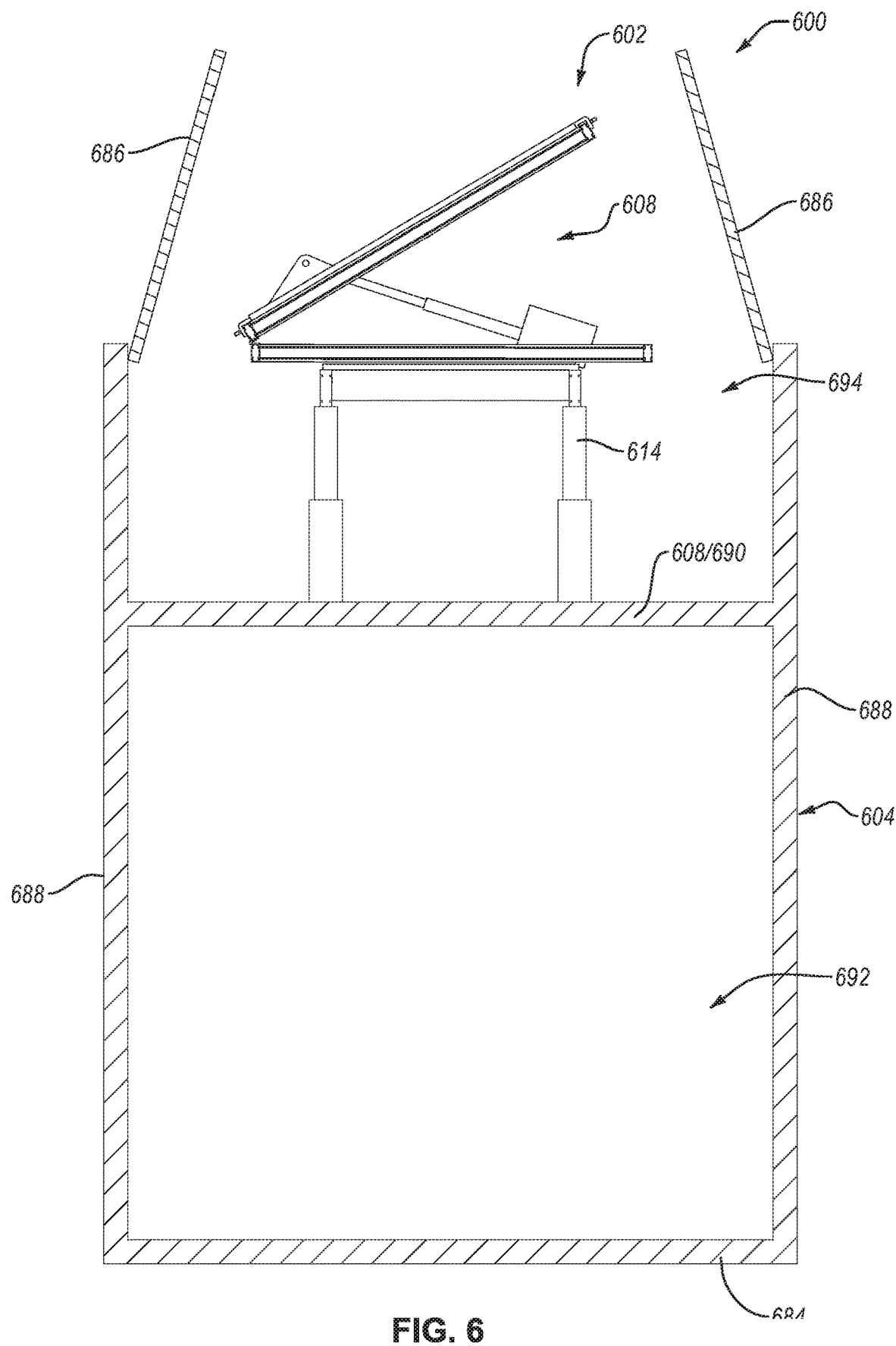
FIG. 6 is a schematic side view of a system that includes a solar tracking apparatus integrally formed with a structure, according to an embodiment.

The embodiments discussed up to this point include solar tracking apparatuses that are distinct to the structures and may be added to the structures. However, it is noted that the solar tracking apparatuses may be integrally formed with the structures. For example, FIG. 6 is a schematic side view of a system 600 that includes a solar tracking apparatus 602 integrally formed with a structure 604, according to an embodiment. Except as otherwise disclosed, the solar tracking apparatus 602 and the structure 604 are the same as or substantially similar to the solar tracking apparatuses and structures, respectively, disclosed herein. For example, the solar tracking apparatus 602 may include a structure attachment portion 606 and at least one solar panel portion 608 and the structure 604 may include a moveable or stationary structure.

In an embodiment, the solar tracking apparatus 602 may be integrally formed with the structure 604 when the solar tracking apparatus 602 is disposed in the structure 604. For example, the structure 604 may include a bottom wall 684, an opposing top wall 686, at least one lateral wall 688 extending between the bottom wall 684 and the top wall 686, and an intermediate wall 690 extending between the at least one lateral wall 688 that is positioned between the bottom wall 684 and the top wall 686. The bottom wall 684, the at least one lateral wall 688, and the intermediate wall 690 may define a first compartment 692. The first compartment 692 may be the same as or substantially similar to the structure interiors disclosed. The top wall 686, the at least one lateral wall 688, and the intermediate wall 690 may define a second compartment 694. The second compartment 694 may be configured to store the solar tracking apparatus 602. To provide the solar tracking apparatus 602 access to the sun, the top wall 686 may be configured to be opened or removed from the structure 604. Further, the solar tracking apparatus 602 may include an actuator 614 configured to move the solar panel portion 608 up out of the second compartment 694 so the at least one lateral wall 688 does not obstruct sunlight to the solar panels 610.

In an embodiment, instead of or in addition to disposing the solar tracking apparatus 602 in the structure 604, the structure attachment portion 606 may form one or more components of the structure 604. For example, in the illustrated embodiment, the structure attachment portion 606 may form the intermediate wall 690.

While various aspects and embodiments have been disclosed herein, other aspects and embodiments are contemplated. The various aspects and embodiments disclosed herein are for purposes of illustration and are not intended to be limiting.

What is claimed is:

1. A system, comprising:
    a structure including a top surface and an opposing bottom surface, wherein the bottom surface is spaced apart from a ground and includes at least one of a weight bearing frame or structural frame; and
    a solar tracking apparatus including:
    a structure attachment portion including a plurality of generally horizontal supports extending along opposing sides of the structure and a plurality of generally vertical supports extending from the plurality of horizontal supports towards the bottom surface of the structure, the structure attachment portion at least partially enclosing the structure on at least two opposing sides;
    a plurality of mounts directly disposed at least proximate to an end of the vertical supports and fixedly attached to the bottom surface of the structure;
    at least one generally horizontal beam structure fixedly coupled to and extending between the plurality of generally horizontal supports;
    at least one solar panel portion coupled to the at least one generally horizontal beam structure and configured to hold one or more solar panels above the top surface of the structure such that the structure attachment portion substantially fully supports the weight of the one or more solar panels above the structure, the at least one solar panel portion moveable in at least two directions relative to the at least one generally horizontal beam structure
    one or more actuators coupled to the at least one solar panel portion and distinct from the structure attachment portion, the one or more actuators configured to move the at least one solar panel portion relative to the structure attachment portion;
    one or more sensors configured to track at least one of a position or movement of the solar panel portion relative to at least one of the structure attachment portion or the structure, the one or more sensors including at least one of an accelerometer, a tilt meter, a gyroscopic sensor, a capacitive displacement sensor, an inclinometer, or an optical sensor; and
    a controller operably coupled to the one or more actuators and the one or more sensors, the controller configured to control the one or more actuators responsive to the one or more sensors sensing so the one or more solar panels held by the at least one solar panel portion face the sun.

2. The system of claim 1, wherein the one or more mounts include steel and the one or more supports include aluminum.

3. The system of claim 1, wherein the one or more actuators include:
    a first actuator configured to controllably move the at least one solar panel portion in an azimuth direction responsive to direction from the controller; and
    a second actuator configured to controllably move the at least one solar panel portion in an altitude direction responsive to direction from the controller.

4. The system of claim 3, wherein the at least one solar panel portion includes a base moveably coupled to the structure attachment portion and a holder moveably coupled to the base, the holder configured to hold the one or more solar panels, the base moveable relative to the structure attachment portion using the first actuator and the holder moveable relative to the base using the second actuator.

5. The system of claim 3, wherein the first actuator includes a bearing apparatus that couples the at least one solar panel portion to the structure attachment portion and the second actuator includes a piston.

6. The system of claim 1, wherein the at least one solar panel portion includes a first solar panel portion and a second solar panel portion, and wherein the first solar panel portion is distinct from and operates independently from the second solar panel portion.

7. The system of claim 1, wherein the one or more solar panels are reversibly coupled to the at least one solar panel portion.

8. The system of claim 1, wherein the one or more sensors further include a magnetometer.

9. The system of claim 1, further comprising a global positioning system receiver configured to detect a geographical location of the solar tracking apparatus.

10. The system of claim 1, further comprising at least one wind gauge.

11. The system of claim 1, wherein the solar tracking apparatus weighs less than 1000 pounds.

12. The system of claim 1, wherein the solar tracking apparatus is waterproof and dustproof.

13. The system of claim 1, wherein the structure includes a moveable structure.

14. The system of claim 13, wherein the moveable structure includes a utility trailer.

15. The system of claim 1, wherein the structure includes a stationary structure.

16. The system of claim 1, further comprising a server operably coupled to the one or more solar panels, the server configured to provide an intranet.

17. The system of claim 1, the solar tracking apparatus includes a power management system configured to receive and store electrical power from the one or more solar panels.

18. A method of operating a solar tracking apparatus, the method comprising:
at a controller, receiving one or more characteristics sensed by one or more sensors, the one or more sensors configured to track at least one of a position or movement of at least one solar panel portion relative to at least one of a structure attachment portion or a structure, the one or more sensors including at least one of an accelerometer, a tilt meter, a gyroscopic sensor, a capacitive displacement sensor, an inclinometer, or an optical sensor, wherein the structure attachment portion is distinct from the structure and the at least one solar panel portion;
transmitting direction from the controller to one or more actuators;
responsive to receiving the direction from the controller, moving the at least one solar panel portion in at least two directions relative to at least one generally horizontal beam structure with the one or more actuators coupled to the controller so one or more solar panels coupled to the at least one solar panel portion face the sun with interaction from an individual including at most at least one of turning on the solar tracking apparatus or input to start moving the at least one solar panel portion so the one or more solar panels face the sun, wherein the one or more actuators are distinct from the structure attachment portion;
wherein:
the structure includes a top surface and an opposing bottom surface, wherein the bottom surface is spaced apart from a ground and includes at least one of a weight bearing frame or structural frame;
the structure attachment portion includes a plurality of generally horizontal supports extending along opposing sides of the structure and a plurality of generally vertical supports extending from the plurality of horizontal supports towards the bottom surface of the structure, the structure attachment portion at least partially enclosing the structure on at least two opposing sides;
a plurality of mounts are directly disposed at least proximate to an end of the plurality of vertical supports and fixedly attached to the bottom surface of the structure
the at least one generally horizontal beam structure is fixedly coupled to and extends between the plurality of generally horizontal supports; and
the least one solar panel portion is attached to the at least one generally horizontal beam structure and configured to hold one or more solar panels above the top surface of the structure such that the structure attachment portion substantially fully supports the weight of the one or more solar panels above the structure.

19. The system of claim 1, wherein the one or more mounts extend horizontally from the one or more vertical supports.

\* \* \* \* \*